Nov. 21, 1950     J. L. MARKIS ET AL     2,530,581
CONTROL FOR ZONE HEATING SYSTEMS

Filed Sept. 13, 1946     10 Sheets-Sheet 1

INVENTORS
JOHN L. MARKIS
HARRY BAXTER
BY
Morton S. Beckman

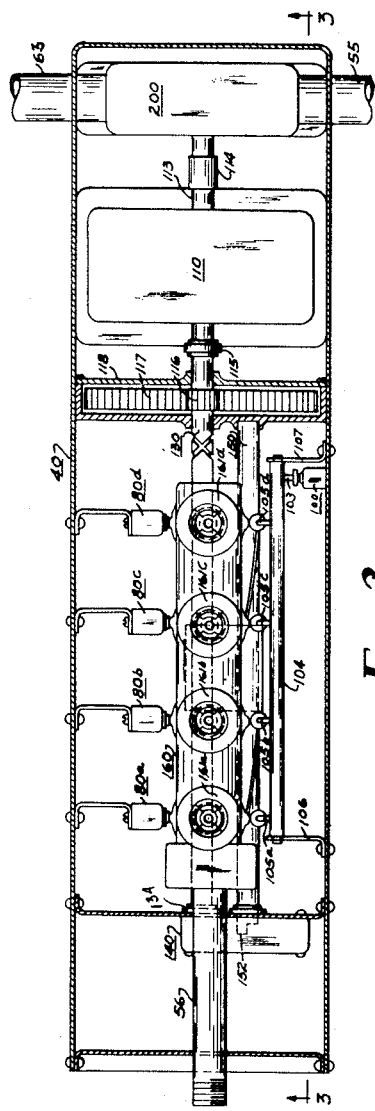
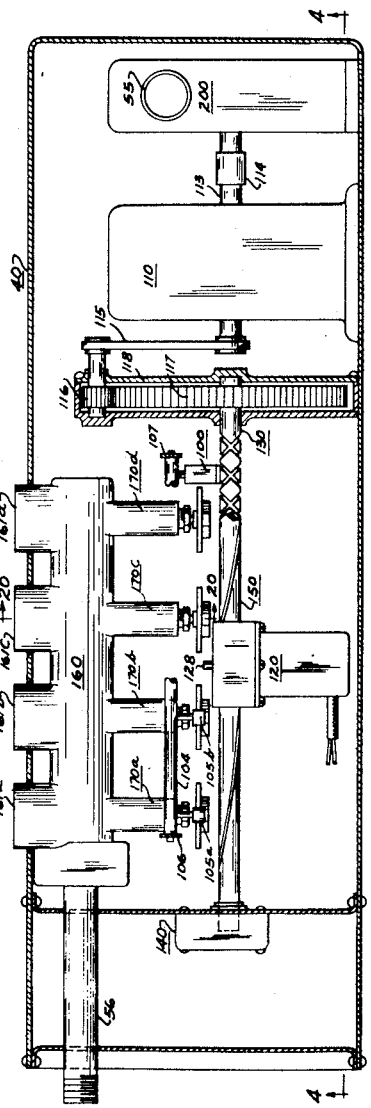

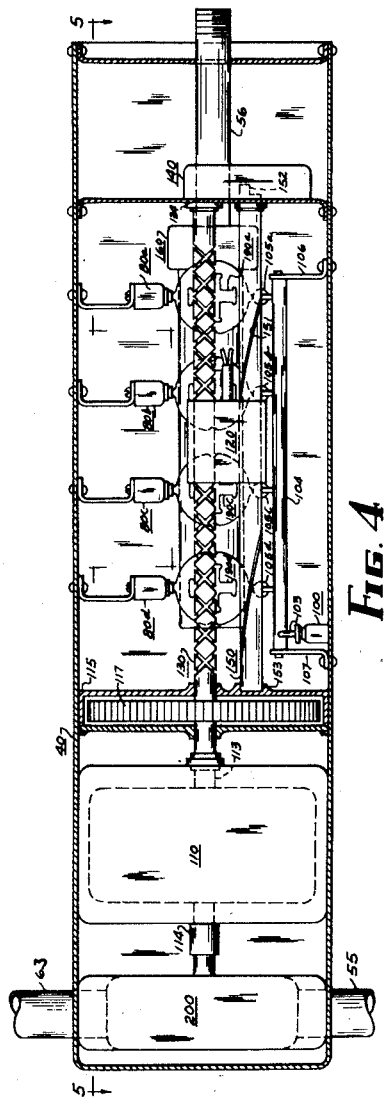
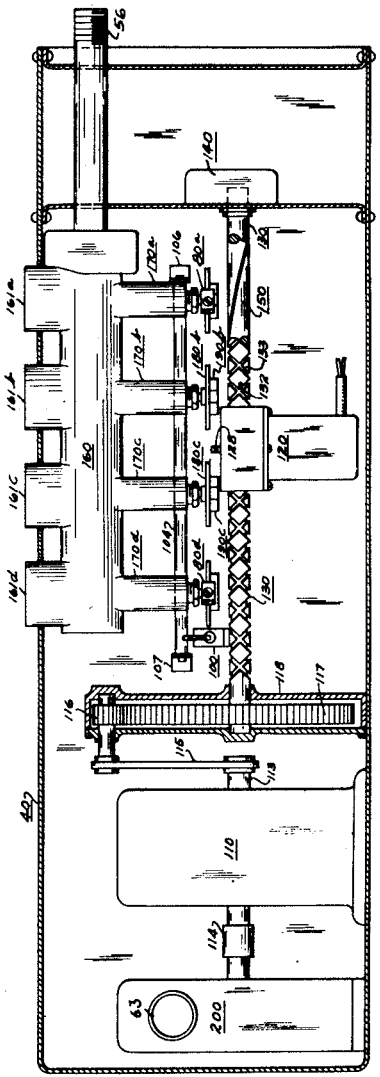
Fig. 4
Fig. 5
INVENTORS
JOHN L. MARKIS
HARRY BAXTER
BY

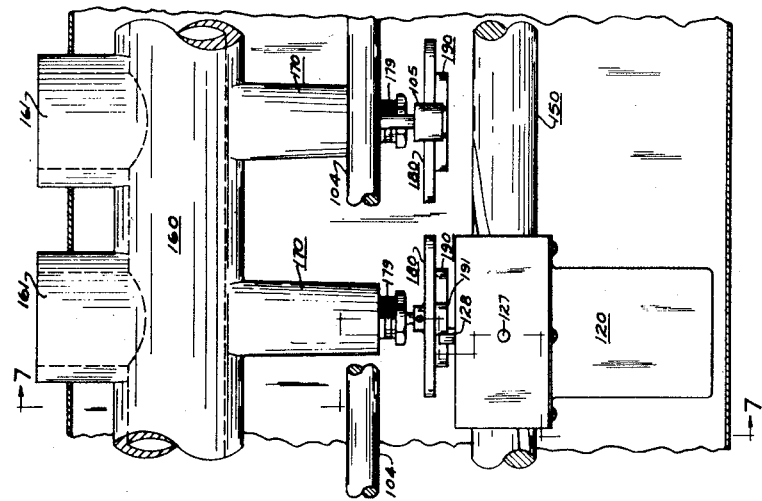

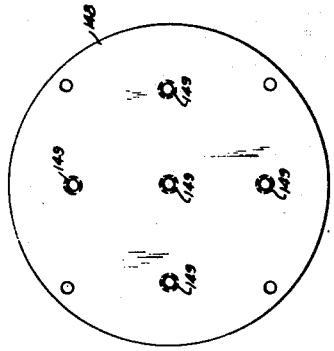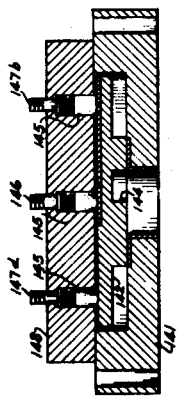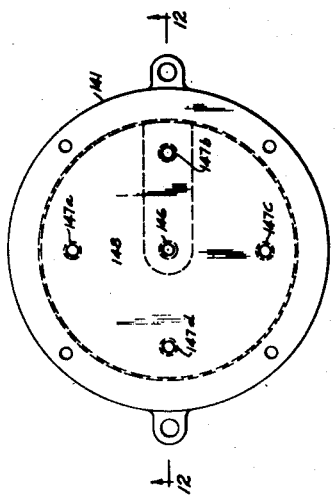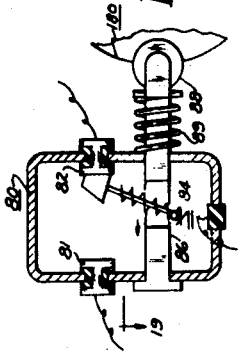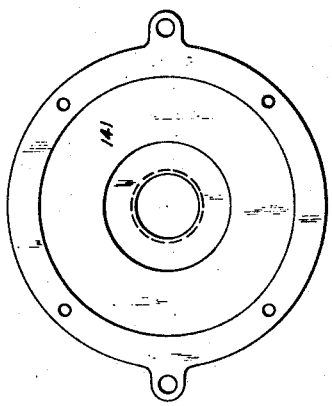
INVENTORS
JOHN L. MARKIS
HARRY BAXTER
BY Nov. 21, 1950  J. L. MARKIS ET AL  2,530,581
CONTROL FOR ZONE HEATING SYSTEMS
Filed Sept. 13, 1946  10 Sheets-Sheet 6
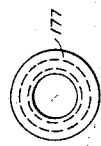
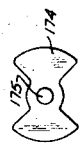
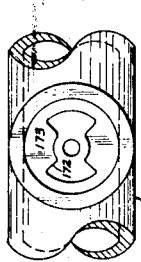
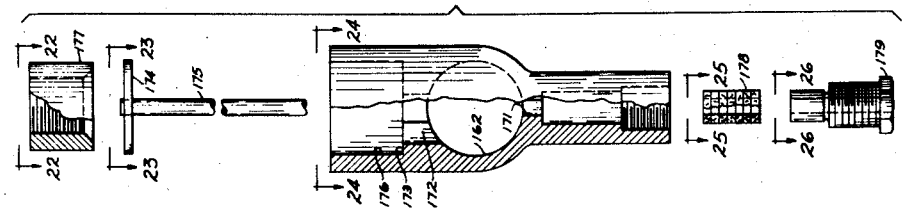
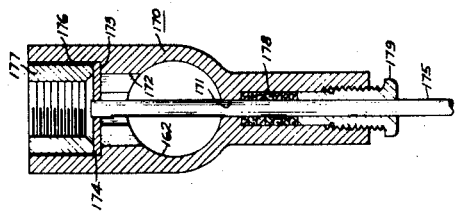
INVENTORS
JOHN L. MARKIS
HARRY BAXTER
BY
Morton S. Brockman

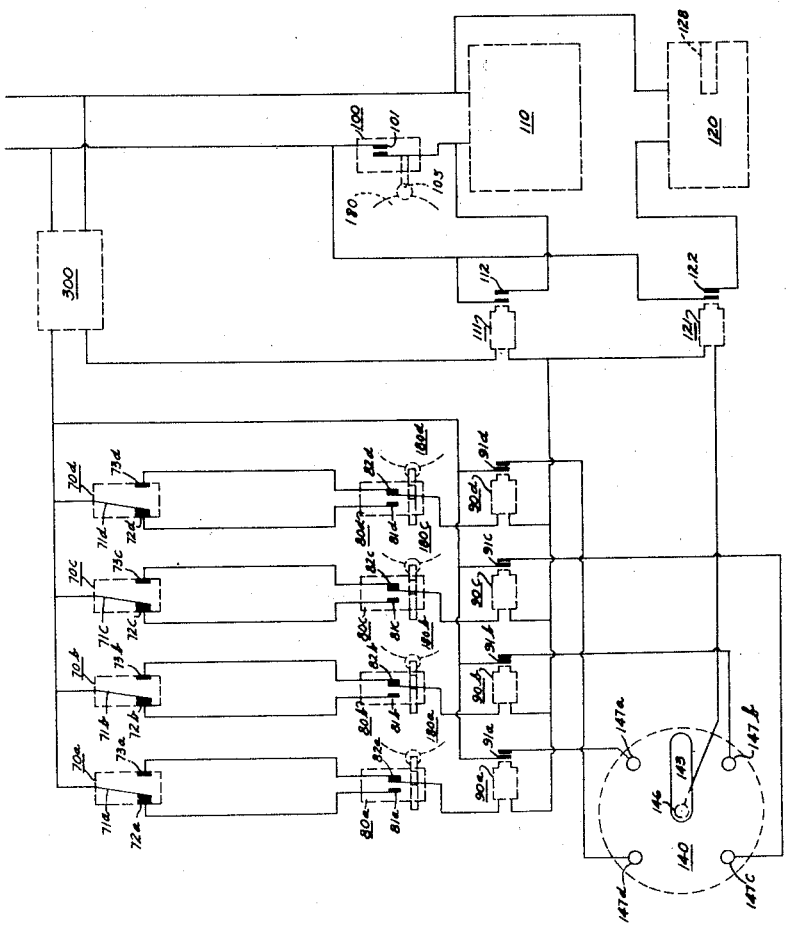

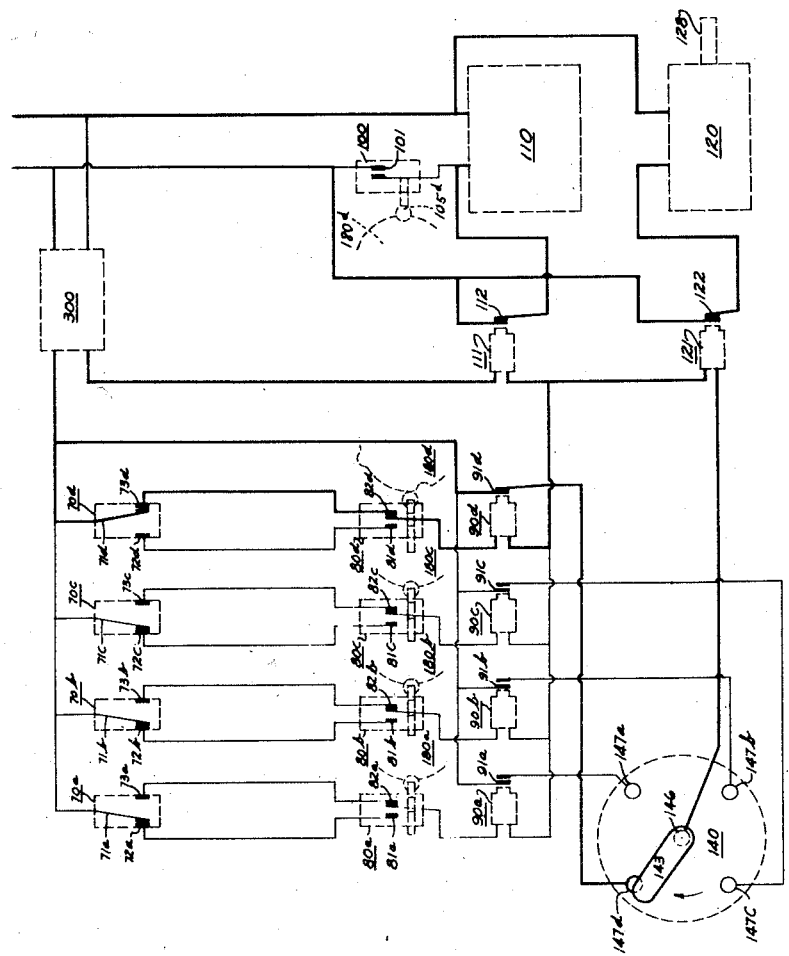

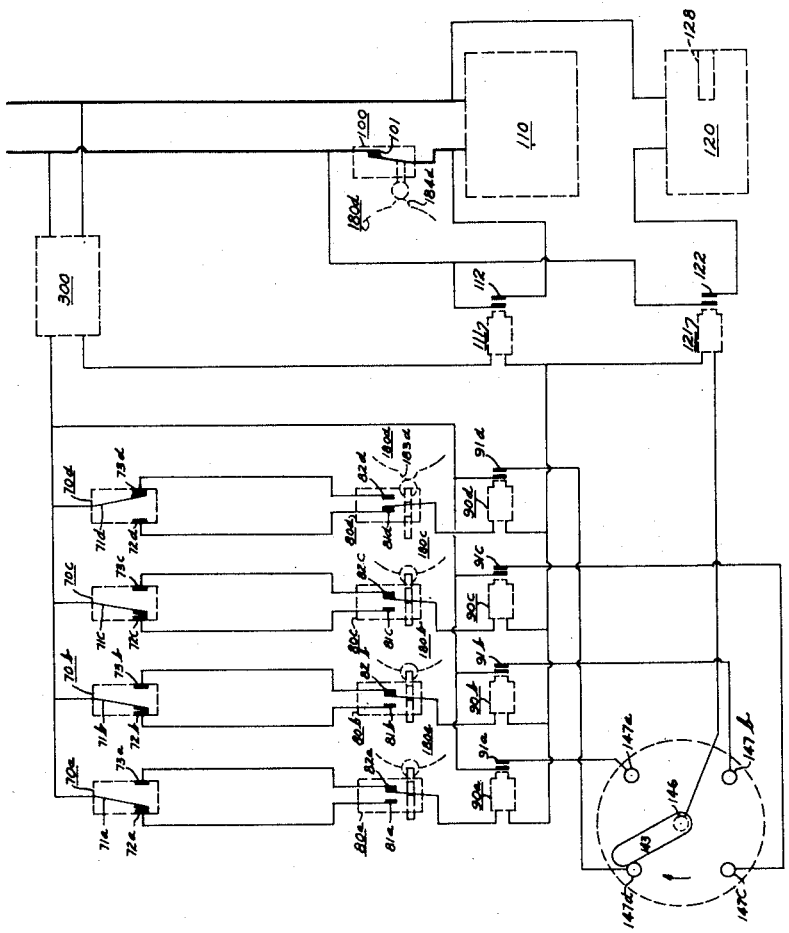

Patented Nov. 21, 1950

2,530,581

UNITED STATES PATENT OFFICE 2,530,581

CONTROL FOR ZONE HEATING SYSTEMS

John L. Markis, Warrensville Heights, and
Harry Baxter, Garrettsville, Ohio

Application September 13, 1946, Serial No. 696,670

3 Claims. (Cl. 237—8)

This invention relates to heating systems and particularly to automatic unit control zone heating systems.

Conducive to a better understanding of this invention it may be well to point out that prior art devices show many control heating systems all of which employ individual motors, magnets, solenoids or the like together with driven apparatus, to operate the valves or dampers controlling each zone. While this is satisfactory from an engineering standpoint it is most unsatisfactory from an economic viewpoint, since the necessary duplication of such expensive motors and apparatus makes such installations very costly. The result has been to retard the sale and installation of zone heating systems, which would otherwise be very popular since they save fuel and provide a maximum of comfort with a minimum of attention.

With our invention only one valve operating device is needed to collectively open, close or pass by any number of valves which control the flow of heat to the respective zones. Therefore our controller can be more economically manufactured and can be sold at a price that will permit the average small home owner to enjoy the benefits of modern zone heating.

In view of the foregoing, the primary object of this invention is to provide a heating system that has a new and improved control means for maintaining predetermined temperatures in each of several zones and which zones are supplied with a heating medium coming from a single source.

Another object is to provide a new and improved zone control heating system having only one actuating means for controlling temperatures in a plurality of independent zones.

A further object is to provide a zone heating system with a combination valve and manifold device which is automatically actuated by independent thermostats in respective zones.

Another object is to provide a single or unitary means for selecting and operating any one or more of a series of valves.

Still another object is to provide a hot water circulating pump and zone control device in the form of a compact unit that can be easily connected to a conventional hot water heating system.

These and other objects of the invention will become apparent from a reading of the following specification and claims together with the accompanying drawings in which like parts are referred to and indicated by like reference characters and wherein:

Figure 2 is a top plan view of the controller;

Figure 3 is a front view of the controller taken substantially along the line and in the direction of the arrows 3—3 of the Figure 2;

Figure 4 is a bottom view of the controller taken substantially along the line and in the direction of the arrows 4—4 of the Figure 3;

Figure 5 is a rear view of the controller taken substantially along the line and in the direction of the arrows 5—5 of the Figure 4;

Figure 6 is an enlarged front elevation of a portion of the device showing the relative positions of certain valves and solenoid;

Figure 7 is a view taken substantially along the line and in the direction of the arrows 7—7 of the Figure 6 and particularly showing a certain microswitch in a first position;

Figure 8 is a view taken along the line and in the direction of the arrows 8—8 of the Figure 7 and particularly showing a certain valve cam in a first position;

Figure 9 is an alternate view of the Figure 8 showing the said valve cam in a second position;

Figure 10 is an alternate view of a portion of the Figure 7 showing the said microswitch in a second position;

Figure 11 is an enlarged top view of the assembled distributor switch;

Figure 12 is a cross-sectional view taken along the line and in the direction of the arrows 12—12 of the Figure 11;

Figure 13 is a top view of the distributor cover plate particularly showing the location of the brush holder holes;

Figure 14 is a top view of the distributor base particularly showing the rotor cavity and central bearing hole;

Figure 15 is a side view of the distributor rotor with a portion thereof broken away to show the electrode and the eccentric key hole;

Figure 16 is a top view of the said distributor rotor electrode;

Figure 17 is a side view of a carbon brush used in the distributor switch;

Figure 18 is an enlarged sectional view of a cam switch taken substantially along the line and in the direction of the arrows 18—18 of the Figure 7;

Figure 19 is a view of the same cam switch taken along the line and in the direction of the arrows 19—19 of the Figure 18;

Figure 20 is an enlarged cross-sectional view of one of the valve assemblies taken along the line and in the direction of the arrows 20—2 of the Figure 3;

Figure 21 is an exploded view of the same valve assembly, partly in section;

Figure 22 is a top view of the outlet collar taken along the line and in the direction of the arrows 22—22 of the Figure 21;

Figure 23 is a top view of the valve gate member taken along the line and in the direction of the arrows 23—23 of the Figure 21;

Figure 24 is a top view of the valve body taken substantially along the line and in the direction of the arrows 24—24 of the Figure 21;

Figure 25 is a top view of the packing taken along the line and in the direction of the arrows 25—25 of the Figure 21;

Figure 26 is a top view of the packing nut taken along the line and in the direction of the arrows 26—26 of the Figure 21;

Figure 27 is a schematic view of the electrical circuit embodied in this invention and particularly showing all of the zone thermostats in their "off" condition and the entire system inoperative and shut down;

Figure 28 is a first alternate view of the same electrical circuit and showing one of the zone thermostats calling for heat;

Figure 30:
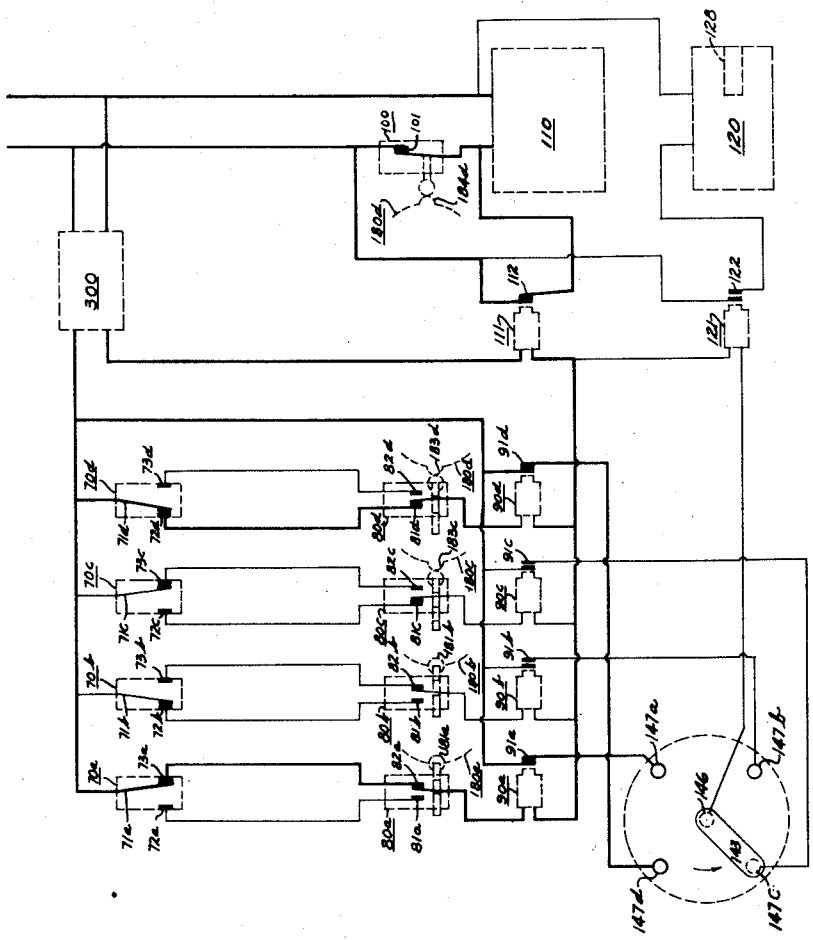

Figure 29 is a second alternate view of the same circuit showing one of the zones being supplied with heat and its thermostat satisfied; and Figure 30 is a third alternate view of the circuit and particularly showing one of the zone thermostats calling for its heat medium valve to be turned on; another one of the zone thermostats calling for its heat medium valve to be turned off and two other zone thermostats in temporarily satisfied condition.

Figure 1:
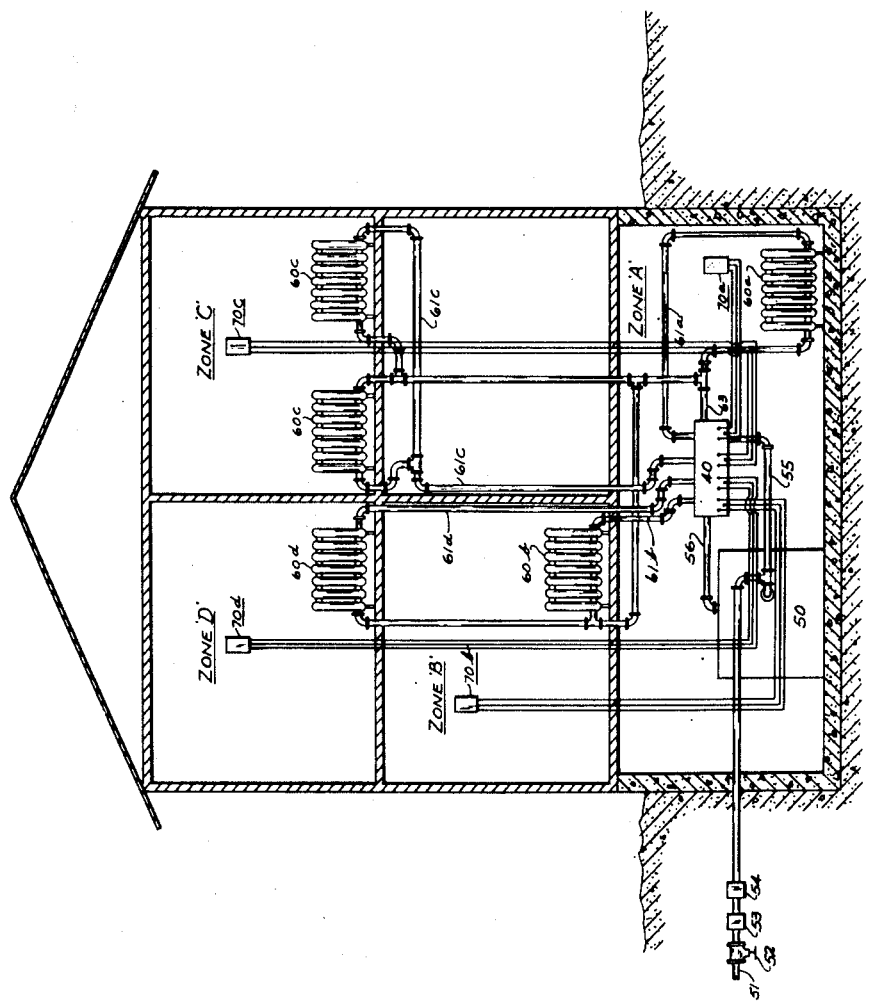
Figure 1 is a sectional view of a building having the automatic unit control zone heating system constituting this invention installed therein.

Figure 1 shows a zone heating system utilizing the control device constituting this invention, as it appears installed in a conventional house. For purposes of illustration, the house shown has four heating zones designated by reference letters A, B, C and D respectively.

Each portion of the heating system has been given a reference number. Where portions are duplicates of one another, differing only as to their location in a particular zone system, the portions have been further characterized and distinguished by the addition of exponents corresponding to the particular zone system of which they form a part.

The heating system illustrated has a conventional hot water boiler 50 including the firing and safety devices usually found in standard installations. Reference character 51 designates a water supply pipe having the usual control devices such as a turnoff valve 52, a pressure control valve 53 and a relief valve 54. Reference character 56 designates the heat medium or hot water pipe which delivers the heated water to the zone controller 40.

Supply pipes 61a, 61b, 61c and 61d carry the hot water to the heat exchangers or radiators 60a, 60b, 60c and 60d respectively which are located in zones A, B, C and D. The water from which the heat has been absorbed is then piped from the radiators back to the controller 40 which it enters through the pipe 63. The water is then returned to the boiler through the pipe 55, thus completing the circuit. This circulation of water is maintained through one or more zones as long as thermostats in the said zones call for heat.

The thermostats 70a, 70b, 70c and 70d are electrically connected to the controller. Each thermostat is activated by the temperature of its particular zone and determines whether or not the heat medium is to be delivered to its particular heat exchanger or radiator unit by the controller.

It will be noted that zone C has two heat exchangers for the purpose of furnishing more radiation surface in this particular zone. These radiators are connected together as shown and both are controlled as a single unit. This is an example of how a single zone may have a plurality of radiators operated by the novel controller.

Figures 2, 3, 4 and 5 will be considered together since they are the top, front, bottom and rear views respectively of the interior of the controller cabinet 40. Reference character 110 designates an electric motor of sufficient power to run the hereinafter described pump 200 to which it is connected by the flexible coupling 114. The capacity of the pump 200 is determined by the size of the heating system with which it is to be used and in accordance with standard engineering practice.

The other end of the motor shaft 113 is engaged with the pinion gear 116 through the belt 115. The pinion gear is in turn engaged with the large gear 117. The gear 117 is mounted in the gear housing 118. The drive shaft 130 is keyed to the gear 117 and is supported by the bearing block 134 at its opposite end. The drive shaft 130 has a pair of crossed spiral grooves or worms 132 and 133 which are connected together at both their extreme ends. Reference character 150 indicates the distributor shaft which has a single spiral groove or worm 151. This shaft is keyed to the distributor rotor 142 at one end and is supported by, and is freely rotatable in, the bearing block 153 at its other end proximate to the gear housing 118.

The solenoid 120 is supported by the shafts or cams 130 and 150 which pass through the bearing holes 124 and 125 respectively of the solenoid head 123. A first fixed peg 126 extends into the bearing hole 124 and engages and rides in the crossed spiral grooves 132 and 133 of the drive shaft 130, thereby causing the solenoid to travel back and forth along the length of the drive shaft as its rotates. A second fixed peg 127 extends into the bearing hole 125 and engages and rides in the spiral groove 151 of the distributor shaft 150, thereby imparting a turning motion to said shaft as the solenoid head is moved along the shaft 150 by the rotating drive shaft 130.

The solenoid 120 is of the conventional type and has a plunger 128 which is withdrawn below the upper surface of the solenoid head when its electrical circuit is open and is caused to protrude vertically above the upper surface of the solenoid head when its electrical circuit is closed. The capacity of the solenoid need not be great since it need only be strong enough to hold the plunger 128 the desired height above the head surface 123. The work done by the plunger involves a pushing action at right angles to its path of travel. Therefore a small, relatively inexpensive, solenoid can be used, which further reduces the cost of the device.

Reference character 160 designates a manifold which is connected to the boiler 50 by means of the hot water main 56. A plurality of outlets 161a, 161b, 161c and 161d as shown in Figure 5 are connected to the zone feed pipes 61a, 61b, 61c and 61d respectively, which in turn distribute the hot water to the various zone radiators as indicated in Figure 1. Each outlet is controlled by a valve 170 whose structure is illustrated in Figures 20 to 26 inclusive.

Reference character 162 indicates the manifold bore; character 171 indicates the valve stem bearing; character 172 indicates the hour-glass shaped water passageway; character 173 indicates the valve seat; and character 176 indicates the outlet hole. A gate member or valve stem 175 having an hour-glass shaped disk or head 174 is rotatably mounted in the bearing hole 171. The lower surface of the head 174 rests on the valve seat 173. A collar 177 having an internal thread is sweated into the outlet hole 176 in such a manner that it holds the hour-glass shaped head 174 in close rotatable contact with the seat 173 as illustrated in Figure 20. The valve stem assembly is kept watertight by the packing 178 which is expanded and held in place by the gland nut 179.

The corresponding hour-glass shape of the valve head and seat opening result in a valve that can be completely opened or closed by a quarter turn of the valve head as will be seen from an examination of Figure 24. However, it should be noted that other designs or shapes of valve heads and valve openings may be used.

A cam wheel 180 and a cross-shaped web 190 are rigidly attached to the opposite end of the valve stem as indicated in Figures 6, 7, 8 and 9. Each cam wheel has two lugs 183 and 184 placed 180 degrees apart and two concave notches 181 and 182, also placed 180 degrees apart, and located 90 degrees from each lug. The cam wheel is mounted on the valve stem 175 so that a vertical plane drawn through the center of the two lugs will also pass through the center of the two halves of the hour-glass shaped valve head 174.

A cross-shaped web 190 is rigidly mounted on the valve stem 175 or otherwise affixed thereto, so that the center line of one set of legs 191 will coincide with the center line of the two halves of the hour-glass shaped valve head, the other set of legs 191 being at right angles to the first set.

Reference character 140 indicates a distributor whose structure is illustrated in detail in Figures 11 to 17 inclusive. The base portion 141 of the distributor has a circular cavity in which the rotor 142 is free to turn as illustrated in Figure 12. The rotor is made of plastic or other dielectrical material or non-conductor and has a flat electrode 143 imbedded in its upper surface. An eccentric hole 144 in the lower surface of the rotor engages the key 152 of the distributor shaft 150. The rotor therefore turns as a unit with the distributor shaft 150.

The cover plate 148, which is also made of plastic, or other dielectric material, has a series of spaced holes 149 therein. The number of such holes is one greater than the number of valves 170 to be controlled. These holes retain the carbon brushes 145 which are mounted on springs attached to the terminal posts 146 and 147a, 157b, 157c and 157d. The carbon brush of the central terminal 146 makes permanent contact with the rotor electrode 143. The brushes of the 147 series of terminals make intermittent contact with the rotating electrode 143 as it passes over them.

The micro-switch 100 is of the conventional type and has contacts 101 which are normally separated. They are brought together when pressure is applied to the plunger 102. Reference character 104 indicates a pivot rod rotatably mounted on the brackets 106 and 107. The pivot rod runs proximate and parallel to the series of manifold valves as indicated in Figure 2. A series of cam rollers 105 is suspended from the pivot rod in line with each valve cam wheel and is kept in contact with the edge of each cam wheel by the expansion spring 108. A switch activating lever 103 is rigidly attached to the rod 104 in line with the plunger 102, and is capable of either pressing the plunger 102 inward or moving away from the said plunger, depending upon the direction in which the pivot rod 104 is rotated.

When one of the cam wheels 180 assumes the position shown in Figure 8 with the cam lug 184 pushing the roller 105 away from the periphery of the cam wheel, the micro-switch plunger is depressed by the pivot rod lever 103 as indicated in the Figure 7. When a cam wheel 180 assumes the position shown in Figure 9 the cam notch 181 permits the roller 105 to move inward toward the center of the cam wheel, and this causes the pivot rod lever 103 to move away from the micro-switch plunger 102, as indicated in the Figure 10.

The cam toggle switches 80a, 80b, 80c and 80d are illustrated in enlarged form in Figures 18 and 19. The toggle switch 80 has two stationary electrodes 81 and 82 and a third movable electrode 83. Electrode 83 is caused to move between the two stationary electrodes with a snap action by the toggle spring 84 which is of a conventional type.

Reference character 86 indicates an actuating arm slidably mounted within the switch case and having a vertical slot 87 cut in its central portion and a roller 88 mounted on one end. A spring 89 normally keeps the roller end of the arm protruding from one side of the switch case, but by applying pressure to the roller the actuating arm 86 can be slid through the switch case. As the actuating arm travels inward, the edge of the slot 87 comes in contact with the toggle spring mechanism 84. After enough pressure has been built up the toggle mechanism snaps the movable electrode 83 over into contact with the stationary electrode 81. Release of pressure on the roller 88 causes the spring 89 to push the actuating arm out of the case and the toggle mechanism is made to snap the electrode 83 back into contact with electrode 82 as illustrated in Figure 18.

Reference characters 70a, 70b, 70c and 70d indicate zone thermostats located in zones A, B, C and D respectively of a building having four heating zones such as that illustrated in Figure 1.

Each thermostat has a bimetal movable thermal arm carrying an electric contact 71a, 71b, 71c, 71d. In addition each has an "off" contact 72a, 72b, 72c, 72d and an "on" contact 73a, 73b, 73c, 73d.

Reference characters 80a, 80b, 80c and 80d indicate the series of cam toggle switches shown in Figures 2, 4, 5, 7, 8, 9, 18 and 19. The position of the cam wheels 180a, 180b, 180c and 180d as shown in Figure 27 indicate that the valves 170a, 170b, 170c and 170d which are shown in Figure 5 are in their closed position. The movable toggle arms of the cam toggle switches are in contact with the stationary contacts 82a, 82b, 82c and 82d as shown in Figure 27 since the toggle switch rollers are in contact with the cam wheel notches 182 as shown in Figures 9 and 18. Reference characters 90a, 90b, 90c and 90d indicate conventional thermostat relays having a single set of contacts 91a, 91b, 91c and 91d.

Each of the thermostat relays is connected to one of the distributor terminal posts 147a, 147b, 147c and 147d as indicated. The central rotor terminal post 146 is connected to the solenoid relay 121 which has a single set of contact points 122. The motor relay 111 is connected in series with the thermostat relay windings and the solenoid relay windings as indicated.

Since the cam toggle switches show the cam wheels to be in the position illustrated in Figure 9, the cam rollers must be in the position illustrated in Figure 10. Therefore the contacts 101 of the micro-switch 100 are open as indicated in Figure 27. Reference character 300 indicates a 6 volt transformer for supplying low voltage current to the thermo-electrical system. Reference character 110 indicates the electric controller and pump motor which is shown connected in a 110 volt electric circuit. Reference character 120 indicates the solenoid with its plunger 128 retracted.

Inspection of Figure 27 will show that none of the electrical circuits are completed, therefore none of the electrical devices are in operating condition. Therefore the entire controller system is at a standstill.

In order to make the operation of the invention clear Figures 27 to 30 inclusive portray schematically a series of thermo-electric circuits indicating the operation of the zone heating system apparatus constituting this invention under a variety of normal conditions.

Figure 27 indicates the condition of the system when it is entirely shut down and inoperative. As shown here none of the zones are calling for or are receiving heat.

Figure 28 indicates the same system illustrated in Figure 27 except that one of the zone thermostats 70d is calling for heat. The thermostat arm 71d has swung into contact with the "on" contact 73d. The 6 volt circuit is now completed through contact 82d of the cam toggle switch 80d thereby energizing the thermostat relay 90d and then passing on to energize the motor relay 111. The motor relay contacts 112 close and start the motor 110. The motor starts the pump going and also causes the drive shaft 130 to rotate. Since the solenoid 120 is keyed to the spiral slots 132 and 133 by the peg 126, the turning of the shaft causes the solenoid to move along the drive shaft while it rests on the distributor shaft 150 which runs through the bearing hole 125 as indicated in Figures 2, 3, 4, 5 and 7.

The solenoid moves along the drive shaft in parallel spaced relation with the valve cam wheels 180a, 180b, 180c, 180d and the cross-shaped webs 190a, 190b, 190c and 190d. When the peg 126 reaches the end of one spiral slot it switches over to the other spiral slot in accordance with well known mechanical principles. The solenoid is carried back down the length of the drive shaft until it comes to the other end whereupon its direction is again reversed. The solenoid 120 continues to reciprocate past the series of valve regulators as long as the motor 110 is running. The drive shaft 130 is geared down so that its speed is such that the solenoid 120 will move relatively slowly up or down or along the shaft. A speed of one or two passes per minute will be ample for most purposes. This low speed also results in a longer life for the apparatus.

The sliding motion of the solenoid 120 along the distributor shaft 150 causes it to turn, since the peg 127 is keyed to the spiral slot 151. The turning of the distributor shaft causes the distributor rotor 142 to also turn since it is keyed to the end of the shaft 150.

The rotor is set to make one turn in the time it takes the solenoid 120 to make one pass along the drive shaft 130. The rotor 142 reverses itself and makes another turn during the reverse pass. The carbon brushes 145 are spaced so that the solenoid plunger 128 will just be opposite the centerline of a valve web at the time the rotor electrode reaches the center of the corresponding carbon brush.

In Figure 28 the solenoid 120 is shown frozen in motion. The closed contacts 91d of the energized thermostat relay 90d cause current to pass to the distributor terminal 147d. The rotor electrode 143 is shown the instant after it has made contact with the terminal 147d. The current is carried by the rotor electrode to the center terminal 146 and thence travels to the solenoid relay 121. The energized solenoid relay causes the contact points 122 to close, thereby energizing the 110 volt solenoid 120. This causes the plunger 128 to extend vertically above the solenoid head 123 as indicated in Figures 6 and 7. The plunger is shown just making contact with a leg 191d of the valve web 190d of the valve 170d as shown in Figure 7 so that the cam wheel 180d in Figure 28 has just started to turn. The micro-switch 100 is still open.

Figure 29 illustrates the same set of conditions as those indicated in Figure 28 except that a time interval of a few seconds has passed. The solenoid carrying the extended plunger 128 has passed by the valve web 190d, pushing the extended leg 191d of the web ahead of it thereby causing the valve stem to make a full quarter turn and opening the valve 170d. Hot water can now be pumped into the pipe 61d. The radiator 60d then receives the hot water and starts to deliver heat to zone D. The turning of the cam wheel 180d has brought the lug 183d into contact with the roller of the cam toggle switch 80d. This causes the movable arm 83d to make contact with terminal 81d thereby breaking the thermostat relay circuit. The contacts 91d of the relay 90d fly open, thus breaking the solenoid relay circuit which in turn causes the solenoid relay contacts 122 to open and break the 110 volt solenoid circuit.

The plunger 128 then drops down below the surface of the solenoid head. The movement of the cam wheel 180d also causes the second lug 184d to come in contact with the cam roller 105d thereby closing the micro-switch contacts 101. The closed micro-switch keeps the motor circuit closed even though it can be seen that all the thermostat relay circuits are open, and therefore the motor relay 111 has its contacts 112 open also. The motor is thus kept running by the micro-switch as long as one or more of the valves 170 are in their open condition and calling for hot water which is delivered to them by action of the pump 200. The solenoid continues to reciprocate back and forth as long as the motor and pump are running, but since the plunger 128 is retracted it passes by all the valves without causing any change in their condition. As soon as any one of the several thermostats call for a change of temperature the plunger 128 will project outward in a manner and at a time when its particular valve may be operated on.

Figure 30 shows that the valves 170a and 170b of zones A and B respectively are closed as indicated by the position of the cam wheel notches 181a and 181b. The position of the movable arm 71a of the thermostat 70a which is shown in contact with the "on" terminal 73a indicates that zone A is calling for heat. The thermo-electric circuit of zone A is complete up to the distributor terminal 147a.

The setup of zone B indicates that it is not receiving heat, since its valve is closed. The condition of the zone thermostat 70b further indicates that no additional heat is required there.

With respect to zone C, the position of the cam lug 183c indicates that valve 170c is open and is therefore delivering heat medium to the said zone C. The condition of the thermostat 70c indicates that zone C is in need of a continuing supply of heat medium.

With respect to zone D, the position of the cam lug 183d indicates that the valve 170d is turned on and is delivering hot water there. The condition of the thermostat 70d indicates that zone D is now too hot and is calling for the supply of hot water to be turned off. The thermo-electric circuit of the zone D is complete up to the distributor terminal 147d.

The distributor rotor electrode 143 is shown in contact with terminal 147c which indicates that the solenoid is opposite valve 170c. Since zone C is satisfied with the status quo the terminal 147c is not electrified. Therefore the solenoid relay circuit remains open. The solenoid plunger remains retracted within the solenoid head and will pass by the valve web 190c without touching it. As soon as the rotor electrode comes in contact with either terminal 147d or 147a the solenoid plunger will be caused to protrude. It will then turn off valve 170d and turn on valve 170a as it passes by.

Radiators that are located on the same level or lower than the boiler, such as indicated by 60a in zone A of Figure 1, are usually hard to heat since the higher radiators have a tendency to "steal" the hot water from them.

With this improved zone heating system, easy-to-heat zones are quickly satisfied and are then turned off. All of the heat medium is then delivered to the lower heating zones more in need of heat.

It will now be clear that there is here provided a device which accomplishes the objects of the invention heretofore set forth. While the invention has been disclosed in its preferred form; it should be understood that its use is not limited to domestic heating systems only, but that it can be extended to selectively operate valves in any distribution system, whether the material being handled is solid, liquid or gaseous. Furthermore the specific embodiment of this invention as described and illustrated herein is not to be considered in a limited sense as there may be other forms or modifications of the invention which should also be construed to come within the scope of the following claims.

We claim:

1. In a zone heating system of the type having a source of heated fluid, pipes extending from said source to a plurality of heating zones, and a thermostat for each zone, a control apparatus, comprising a straight manifold member positioned between the said source and pipes and having a plurality of valves mounted therein controlling the flow of fluid into each of the said pipes, a valve operating means mounted on each of the said valves and including a cam having arcuate and cross-shaped camming surfaces, all of the said cams being aligned in a single plane parallel to the said manifold, a drive shaft, including driving means, having interconnected cross spiral grooves, mounted in spaced parallel relationship with the said cams, a driven shaft having a single spiral groove, mounted in spaced parallel relationship with the said drive shaft, a selector member slidably mounted on the said shafts, having keys engageable with the several spiral grooves thereof and being reciprocatingly movable longitudinally of the said shafts in response to rotation of the drive shaft, the driven shaft being reciprocatingly rotatable in response to the longitudinal movement of the selector, the selector having a solenoid controlled retractable finger capable of engaging any or all of the said cross-shaped camming surfaces and rotating the cams through an angle of ninety degrees, to either open or close their associated valves when in an energized or extended condition, and of passing any or all of the said cross-shaped camming surfaces when in a deenergized or retracted condition, a plurality of two-position electric switches connected to the aforesaid zone thermostats and operable in response to rotation of the said arcuate camming surfaces, a multi-position electric distributor electrically connected to the said switches and solenoid and operable in response to rotation of the said driven shaft, and a control circuit including the aforesaid thermostats, switches, distributor and solenoid operable in response to predetermined settings of the said thermostats and cams, to either close or open the circuit to either energize the said selector finger, to cause it to open or close any or all of the said valves, or to deenergize the selector finger to cause it to pass any or all of the said valves.

2. In a zone heating system of the type having a source of heated fluid, pipes extending from said source to a plurality of heating zones, and a thermostat for each zone, a control apparatus, comprising, a straight manifold member positioned between the said source and pipes and having a plurality of valves mounted therein controlling the flow of fluid into each of the said pipes, the valve operating means mounted on each of the said valves, all of the said valve operating means being aligned in a single plane, a selector member, means for supporting the selector member in sliding parallelism with the plane of the said valve operating means, driving means for moving the said selector member reciprocatingly of the said aligned valve operating means, the selector member having a solenoid controlled retractable finger capable of engaging any or all of the valve operating means when in an energized or extended condition, and of passing any or all of the said valve operating means when in a de-energized or retracted condition, a plurality of two-position electric switches connected to the aforesaid zone thermostats and operable in response to the position of the valve operating means, a multi-position electric distributor, electrically connected to the said two-position switches and solenoid and operable in response to the position of the selector member and a control circuit including the aforesaid thermostats, switches, distributor and solenoid, operable in response to predetermined settings of the said thermostats and valve operating means to either close or open the circuit to either energize the selector finger, to cause it to open or close any or all of the said valves, or to de-energize the selector finger to cause it to pass any or all of the said valves.

3. In a zone heating system of the type having a source of heating fluid, pipes extending from said source to a plurality of heating zones, a motor operated water pump for circulating said fluid and a thermostat for each zone comprising a straight manifold member positioned between the said source and pipes and having a plurality of valves mounted therein controlling the flow of fluid into each of the said pipes, a valve operating means mounted on each of the said valves and including a cam having arcuate and cross-shaped camming surfaces, all of the said cams being aligned in a single plane parallel to the said manifold, a drive shaft, including driving means, having interconnected cross-spiral grooves, mounted in spaced parallel relationship with the said cams, a driven shaft having a single spiral groove, mounted in spaced parallel relationship with the said drive shaft, a selector member slidably mounted on the said shafts, having keys engageable with the several spiral grooves thereof and being reciprocatingly movable longitudinally of the said shafts in response to rotation of the drive shaft, the driven shaft being reciprocatingly rotatable in response to the longitudinal movement of the selector, the selector having a solenoid controlled retractable finger, capable of engaging any or all of the said cross-shaped camming surfaces and rotating the cams through an angle of ninety degrees, to either open or close their associated valves when in an energized or extended condition, and of passing any or all of the said cross-shaped camming surfaces when in a de-energized or retracted condition, a plurality of two-position electric switches connected to the aforesaid zone thermostats and operable in response to rotation of the said arcuate camming surfaces, a multi-position electric distributor electrically connected to the said switches and solenoid and operable in response to rotation of the said driven shaft, a valve control circiut including the aforesaid thermostats, switches, distributor and solenoid operable in response to predetermined settings of the said thermostats and cams, to either close or open the circuit to either energize the said selector finger, to cause it to open or close any or all of the said valves, or to de-energize the selector finger to cause it to pass any or all of the said valves and a pump control circuit including a single position electric switch operable in response to rotation of the said arcuate camming surfaces, the said switch and its associated circuit being closed to energize the aforesaid pump motor when any one of the said valves is in its open condition.

JOHN L. MARKIS.
HARRY BAXTER.

REFERENCES CITED

The following references are of record in the file of this patent:

UNITED STATES PATENTS

| Number | Name | Date |
|---|---|---|
| 2,030,543 | Ross | Feb. 11, 1936 |
| 2,052,918 | Branche | Sept. 1, 1936 |
| 2,113,869 | Atkins | Apr. 12, 1938 |
| 2,184,849 | Rohlin | Dec. 26, 1939 |